United States Patent
Chou

(10) Patent No.: US 11,090,775 B2
(45) Date of Patent: Aug. 17, 2021

(54) ADAPTION DEVICE FOR MOUNTING FIXTURE

(71) Applicant: Wen-Hsiang Chou, Taichung (TW)

(72) Inventor: Wen-Hsiang Chou, Taichung (TW)

(*) Notice: Subject to any disclaimer, the term of this patent is extended or adjusted under 35 U.S.C. 154(b) by 378 days.

(21) Appl. No.: 16/197,371

(22) Filed: Nov. 21, 2018

(65) Prior Publication Data
US 2020/0070291 A1  Mar. 5, 2020

(30) Foreign Application Priority Data

Aug. 28, 2018  (TW) .................................. 107211701

(51) Int. Cl.
*B23Q 3/10* (2006.01)

(52) U.S. Cl.
CPC .................................. *B23Q 3/102* (2013.01)

(58) Field of Classification Search
CPC . B23Q 3/102; B23Q 3/02; B23Q 3/10; B23Q 3/103; B23Q 3/105; B23Q 3/106; B23Q 3/107; B23Q 3/108; B23Q 2703/12; B23Q 2716/08; B25J 15/04; B25J 15/0408; B25J 15/0416; Y10S 279/904; Y10S 279/905
USPC ......................................... 269/37, 309, 310
See application file for complete search history.

(56) References Cited

U.S. PATENT DOCUMENTS

| | | | |
|---|---|---|---|
| 5,167,405 A * | 12/1992 | Cayley, Jr. | B23Q 1/0072 269/309 |
| 8,708,323 B2 * | 4/2014 | Hoyt | B23B 31/1078 269/309 |
| 10,054,149 B2 * | 8/2018 | Hoogstrate | F16B 37/045 |
| 10,603,750 B1 * | 3/2020 | Taylor | B23Q 3/103 |
| 2004/0256780 A1 * | 12/2004 | Lang | B23Q 16/00 269/309 |
| 2013/0168913 A1 * | 7/2013 | Schluessel | B23Q 1/0072 269/309 |
| 2015/0054211 A1 * | 2/2015 | Hediger | B23Q 1/0072 269/309 |
| 2018/0001427 A1 * | 1/2018 | Hediger | B23Q 1/0072 |

\* cited by examiner

*Primary Examiner* — Orlando E Aviles
*Assistant Examiner* — Robert F Neibaur
(74) *Attorney, Agent, or Firm* — Leong C. Lei

(57) ABSTRACT

The adaption device is fastened to a workstation, and fixtures may be conveniently and reliably joined or detached from the adaption device. The adaption device mainly includes a main member having a number of sockets on a front side for mounting a fixture. Inside the main member, there are specifically-shaped blocks in an indentation of the main member, a shaft with dual sets of threads of opposite directions driving the blocks to move away from or towards each other, and rods in radially directional ducts driven by the blocks to move along the ducts into the sockets to lock the fixture 30 and automatically restored by elastic elements. A fixture as such may be conveniently, reliably, and precisely installed on a workstation through the adaption device, and the adaption device allows the manufacturing of products of large varieties to be conducted economically and efficiently.

3 Claims, 6 Drawing Sheets

ADAPTION DEVICE FOR MOUNTING FIXTURE

BACKGROUND OF THE INVENTION a Technical Field of the Invention

The present invention is generally related to fixtures, and more particular to an adaption device for conveniently mounting and replacing fixtures.

b Description of the Prior Art

A major issue of the manufacturing process is the convenience and reliability of fixture installation. Conventional pneumatic and elastic means for the configuration of the fixture is not stable enough for heaving cutting. Taiwan Utility Model Patent M533549 teaches a design using steel balls that may overcome this problem entirely. However, for the productions of products of large varieties, various fixtures have to be repeatedly mounted on the workstation. Their installation and calibration requires a large effort, thereby increasing the production cost. Therefore, Taiwan Utility Model Patent M563936 teaches an adaption device involving pneumatic fastening and steel ball positioning, indeed providing an effective solution. This teaching, however, has a complex structure and therefore may not be affordable to small manufacturers.

SUMMARY OF THE INVENTION

Therefore, a major objective of the present invention is to provide a cost-effective solution so that the change of fixtures on a workstation may be achieved conveniently without sacrificing manufacturing reliability and precision.

The present invention teaches an adaption device that is fastened to a workstation, and fixtures may be conveniently and reliably joined or detached from the adaption device. The adaption device mainly includes a main member having a number of sockets on a front side for mounting a fixture. Inside the main member, there are specifically-shaped blocks in an indentation of the main member, a shaft with dual sets of threads of opposite directions driving the blocks to move away from or towards each other, and rods in radially directional ducts driven by the blocks to move along the ducts into the sockets to lock the fixture 30 and automatically restored by elastic elements. A fixture as such may be conveniently, reliably, and precisely installed on a workstation through the adaption device. The adaption device of the present invention has a simple structure and may by operated by an ordinary hand tool. Its cost is low and may allow the manufacturing of products of large varieties to be conducted economically and efficiently.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
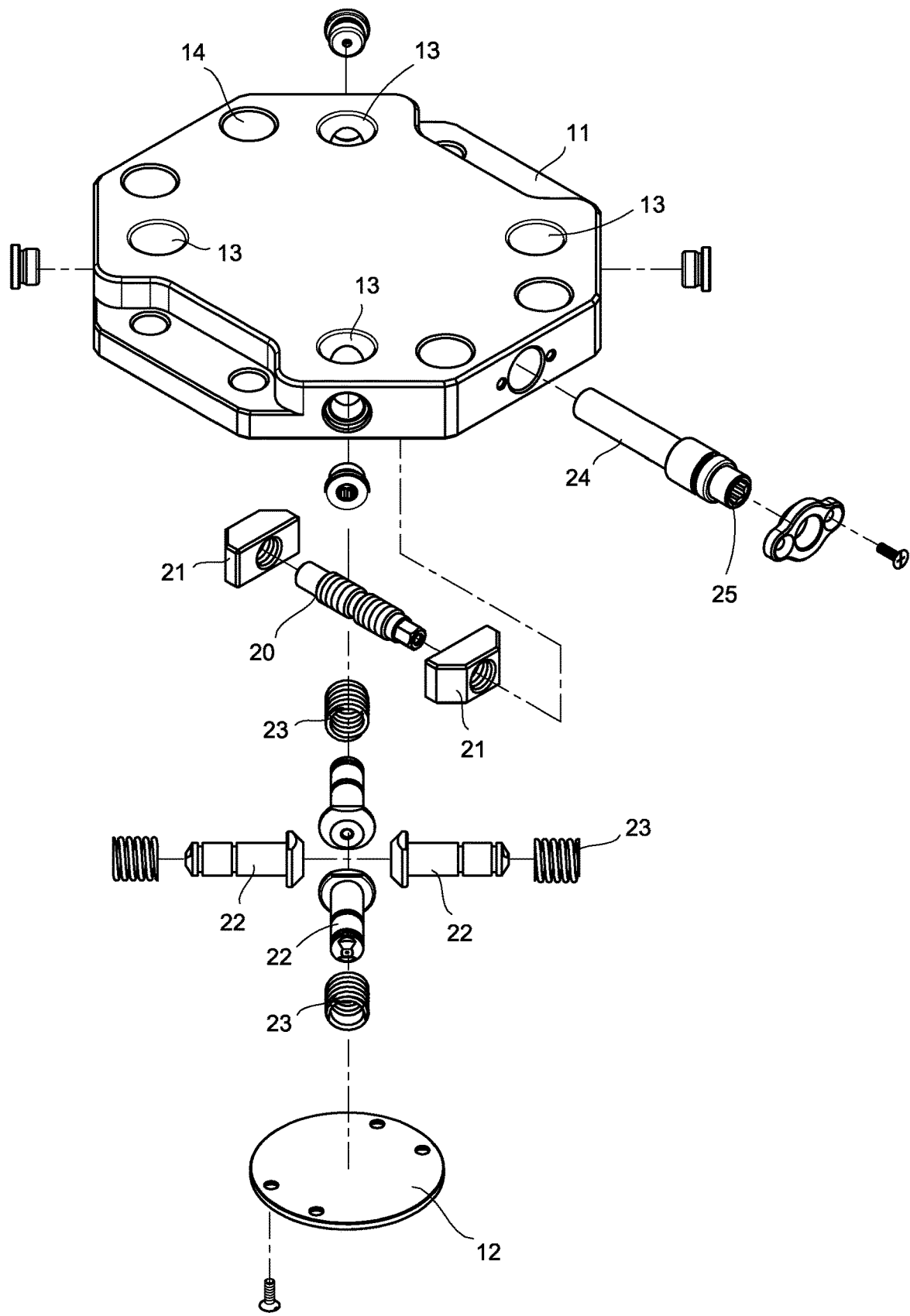
FIG. 1 is perspective break down diagram showing an adaption device for mounting fixture according to an embodiment of the present invention.
Figure 2:
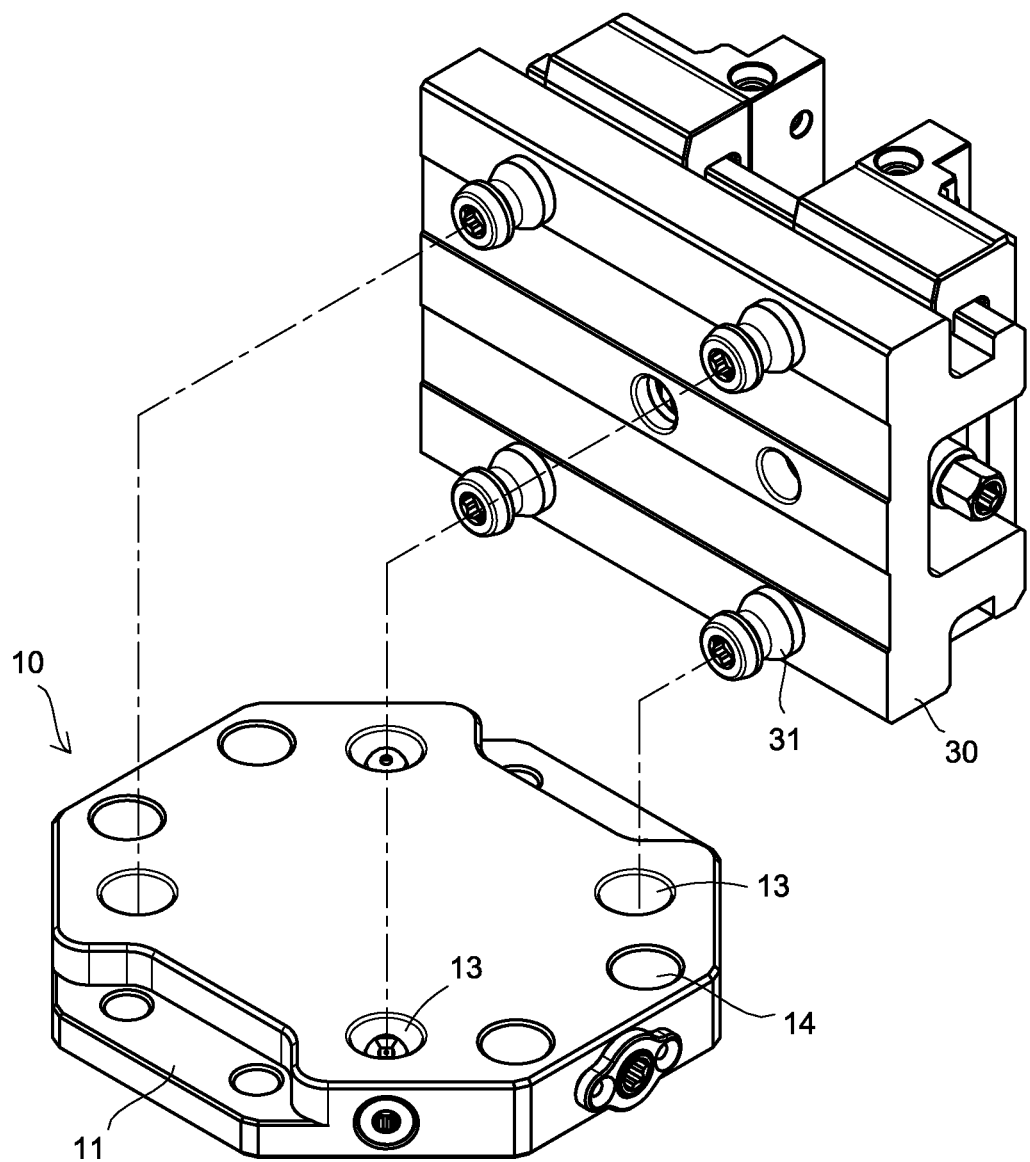
FIG. 2 is a perspective diagram showing a fixture mounted to the adaption device of FIG. 1.
Figure 3:
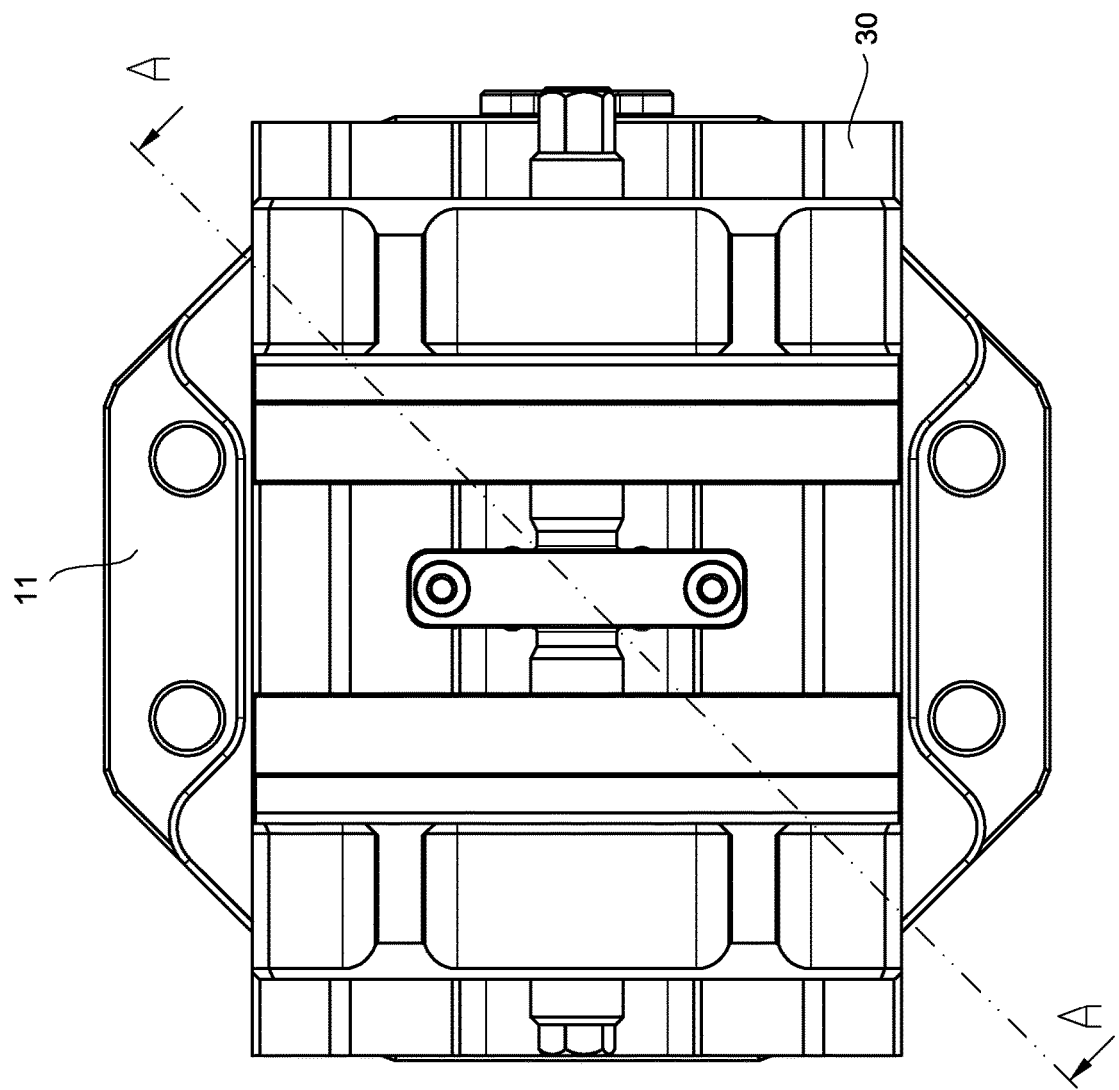
FIG. 3 is a front-view diagram showing the adaption device of FIG. 1 and a fixture joined to the adaption device.
Figure 4:
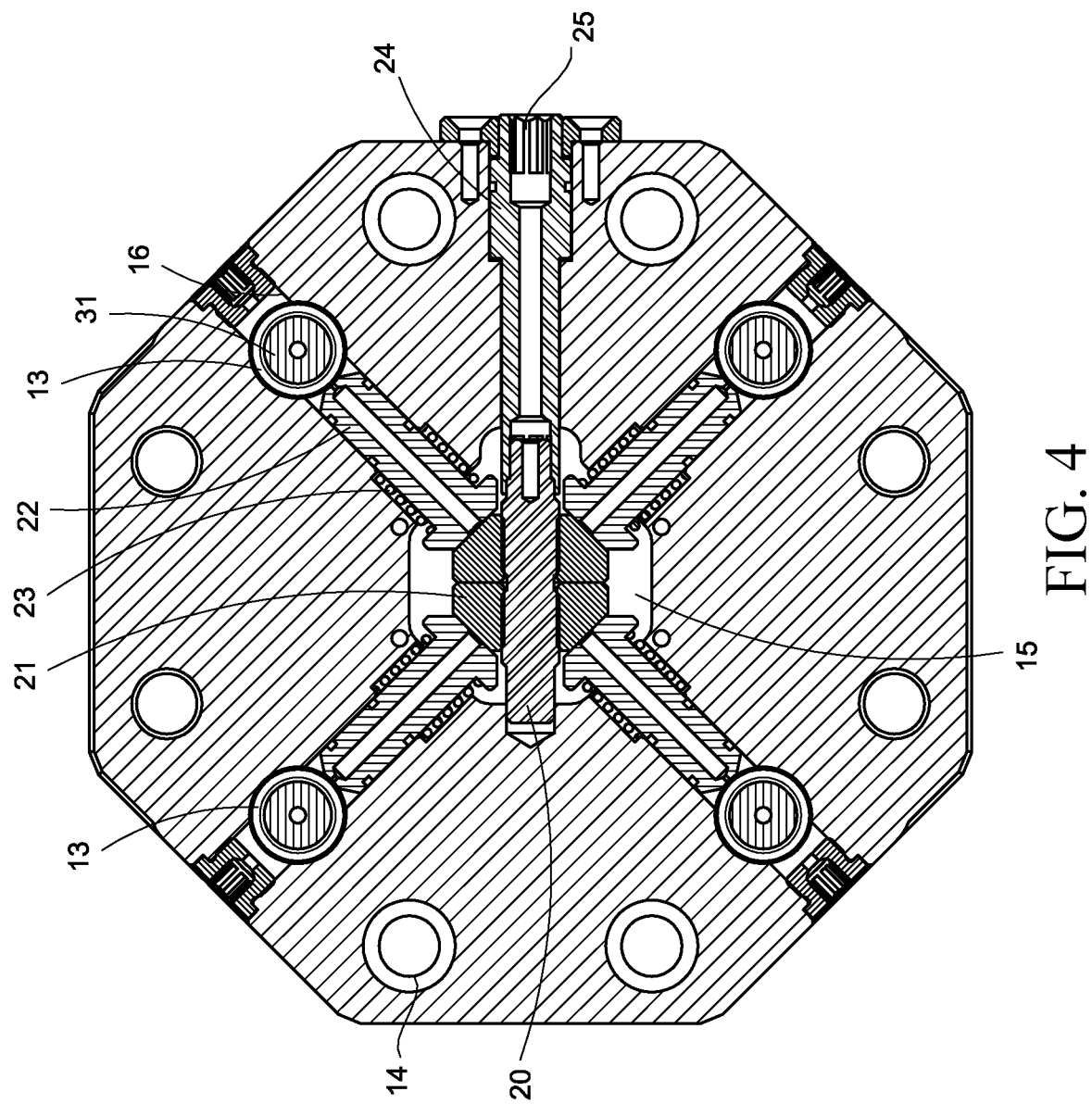
FIG. 4 is a sectional diagram showing the adaption device of FIG. 1.
Figure 5:
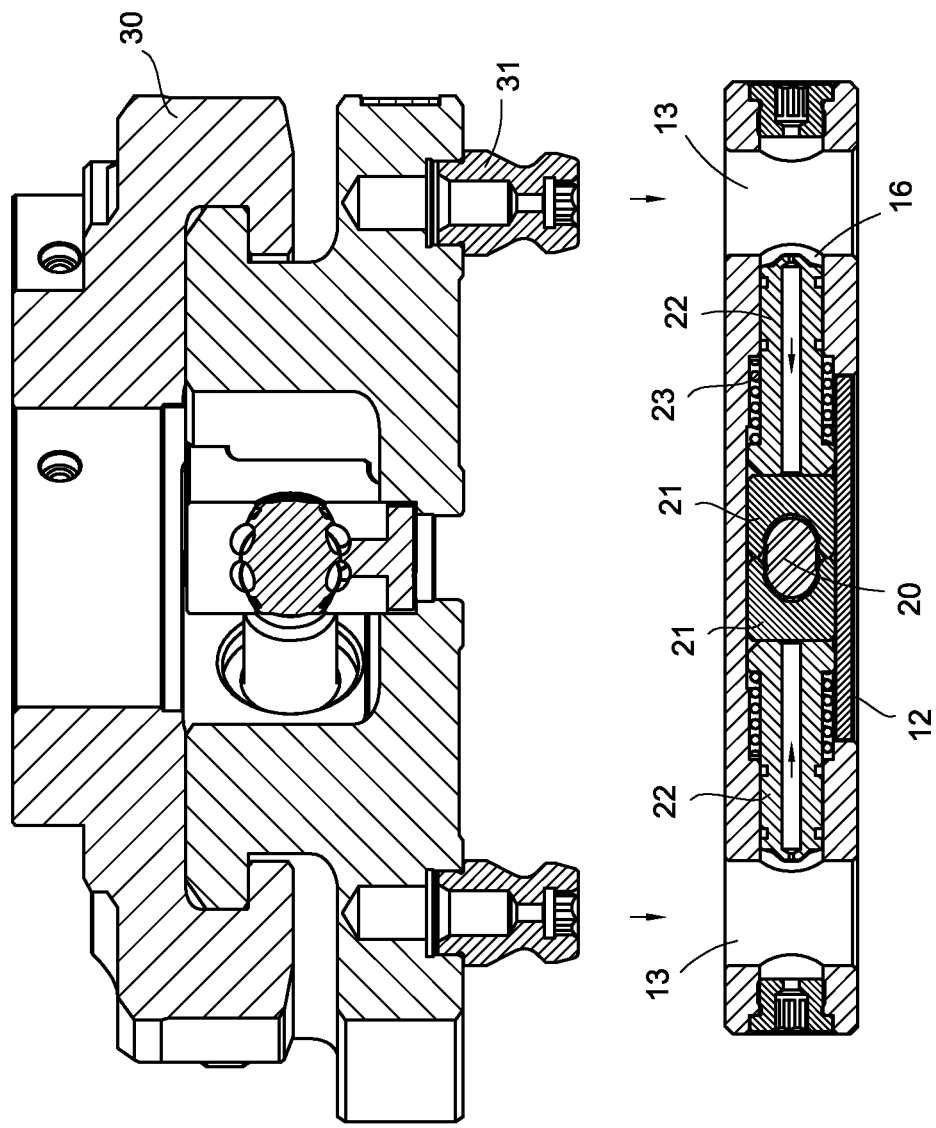
FIG. 5 is a cross-sectional diagram showing the adaption device of FIG. 1 and a fixture before their assembly.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1 to 6, an adaption device 10 for mounting fixture mainly includes a main member 11 and a cover 12 joined together. The main member 11 may have a disc or polygonal shape, and has a number of sockets 13 on a front side for mounting a fixture and a number of through holes 14 for fixing the main member 10. An indentation 15 in the center of a back side of the main member 11 accommodates a pair of symmetrically and oppositely positioned blocks 21. A shaft 20 runs through the blocks 21 that, when the shaft 20 is turned in one direction or the other, the blocks 21 moves towards or away from each other due to two sets of threads of opposite directions around a middle section of the circumference of the shaft 20. Each block 21 has two slant sides and the slant sides of the blocks 21 face towards the sockets 13, respectively. A sliding duct 16 connects a slant side of a block 21 to a socket 13. A bolt-shaped rod 22 threading through an elastic element 232 is housed in each sliding duct 16. Each elastic element 23 is pressed by an inner tip of a larger diameter of a rod 22 and would restore the rod 22 to an original position. The inner tip of each rod 22 contacts with a slant side of a block 21. Each rod 22 has a cone-shaped outer tip. As the blocks 21 are moved outward away from each other, the rods 22 are pushed along the sliding ducts 16 and their outer tips are extended into the sockets 13 so as to fix a fixture 30 whose plugs 31 are plugged into the sockets 13. An outer end of the shaft 20 is connected to a tube 24 and the tube 24 is extended outside the main member 11. The tube 24's exposed end has a socket 25 so that it may be engaged by a tool to turn the shaft 20 and move the blocks 21.

Figure 6:
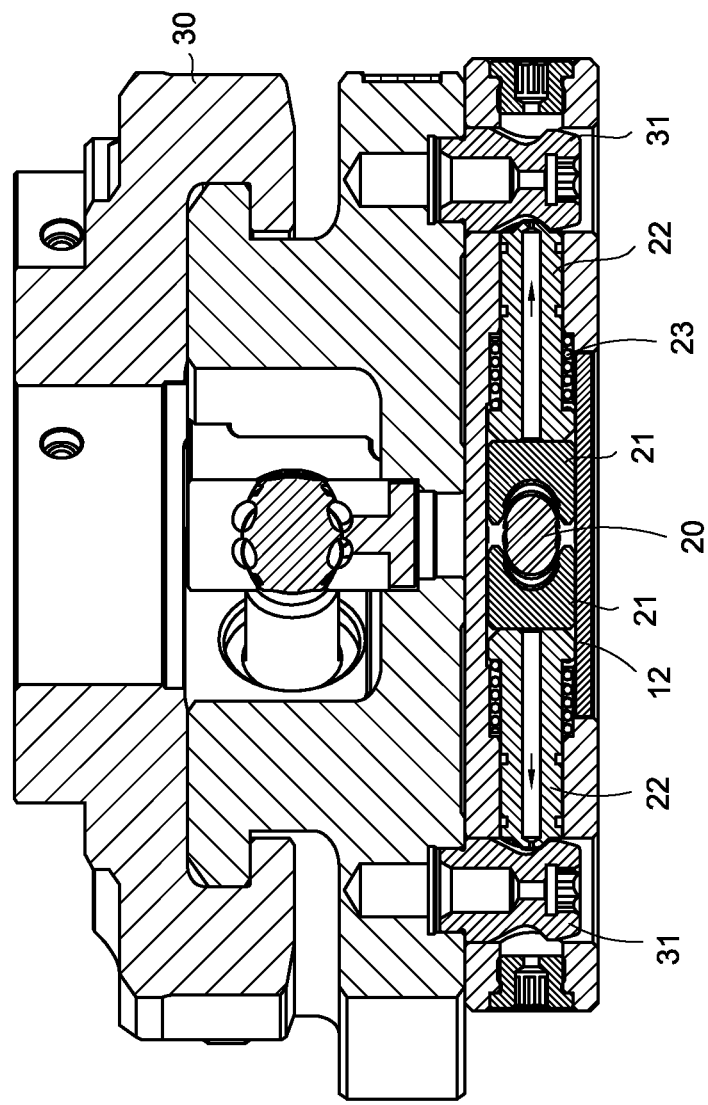
FIG. 6 is a cross-sectional diagram showing the adaption device of and the fixture of FIG. 5 after their assembly.

The adaption device 10 is operated as follows. First, the adaption device 10 is fastened to a work platform of a workstation. Then, a fixture 30 is joined to a front side of the adaption device 10 by having its protruding plugs 31 plugged into corresponding sockets 13 of the adaption device 10. The shaft 20 is turned by a tool (not shown) and, due to the two set of threads of opposite directions, the blocks 21 are guided to move away from each other. As shown in FIG. 6, the slant sides of the blocks 21 push against the rods 22 whose outer tips are as such extended into the sockets 13. Each plug 13 preferably has a ring trough around a front section of the plug 13. The cone-shaped outer tips of the rods 22 as such engages the ring troughs of the plugs 13, respectively. The fixture 30 is therefore reliably locked to the adaption device 10.

The gist of the present invention lies in the blocks 21 stored in the indentation 15 of the main member 11, the shaft 20 with dual sets of threads of opposite directions driving the blocks 21 to move away from or towards each other, and the rods 22 pressed outward along ducts 16 into sockets 13 to lock the plugs 31 of a fixture 30 and automatically restored by elastic elements 23. A fixture 30 may be conveniently, reliably, and precisely installed on a workstation through the adaption device 10. To replace the fixture 30, the shaft 20 is turned in an opposite direction and the blocks 21 are retreated towards each other. As the blocks 21 are retreated, the rods 22 are automatically restored to their original positions by the elasticity of the elastic elements 23. The fixture 30 is as such released and may be conveniently removed. The adaption device of the present invention has a simple structure and may by operated by an ordinary hand tool. Its cost is low and may allow the manufacturing of products of large varieties to be conducted economically and efficiently.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An adaption device for mounting a fixture, comprising:
   a main member; and
   a cover joined to a back side of the main member;
   wherein the main member has a plurality of sockets on a front side for mounting the fixture, wherein the plurality of sockets comprises at least four sockets,
   an indentation in the center of the back side of the main member,
   a pair of symmetrically and oppositely positioned blocks housed in the indentation, wherein each block has two slant sides, wherein each slant side of each block faces a respective socket of the plurality of sockets,
   a shaft, threaded through the blocks, the shaft comprising a middle section, a right hand thread, and a left hand thread, wherein the right hand thread and the left hand thread are separated by the middle section,
   the indentation comprising a plurality of sliding ducts, wherein each of the sliding ducts connects the respective slant side of said block to the respective said socket;
   a plurality of elastic elements; and
   a plurality of rods, wherein each of said plurality of rods are housed in a respective said sliding duct and inserted through a respective elastic element;
   when the shaft is turned in a first direction, the blocks are laterally moved away from each other, as the blocks are moved away from each other, the slant sides of the blocks push a respective inner tip of each of the plurality of rods, the plurality of rods move along the sliding ducts and compress said respective elastic elements, outer tips of each of the plurality of rods are extended into the sockets so as to fix the fixture;
   when the shaft is turned in a second direction, the second direction being opposite from the first direction, the blocks are laterally moved towards each other,
   as the blocks are moved towards each other, the slant sides of each of the blocks are retreated from said respective inner tip of each of the plurality of rods, such that the plurality of rods are restored to their original positions by each of the respective elastic elements, and said outer tips of each of the plurality of rods are retracted into the sliding ducts so as to release the fixture.

2. The adaption device according to claim 1, wherein the main member has a disc or polygonal shape.

3. The adaption device according to claim 1, wherein the outer tip of each of the plurality of the rods has a cone-shaped outer tip.

* * * * *